(12) United States Patent
Chen et al.

(10) Patent No.: US 9,543,605 B2
(45) Date of Patent: Jan. 10, 2017

(54) HYDROGEN GENERATING DEVICE AND POWER GENERATING EQUIPMENT

(71) Applicant: Coretronic Corporation, Hsin-Chu (TW)

(72) Inventors: Ying-Chieh Chen, Hsin-Chu (TW); Chung-Ping Wang, Hsin-Chu (TW); Yu-Hsiang Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 41 days.

(21) Appl. No.: 14/742,640

(22) Filed: Jun. 17, 2015

(65) Prior Publication Data
US 2016/0049675 A1   Feb. 18, 2016

(30) Foreign Application Priority Data
Aug. 15, 2014   (CN) .......................... 2014 1 0401922

(51) Int. Cl.
H01M 8/06       (2016.01)
C01B 3/06       (2006.01)
H01M 8/02       (2016.01)

(52) U.S. Cl.
CPC .............. H01M 8/065 (2013.01); C01B 3/065 (2013.01); H01M 8/0687 (2013.01); *C01B 2203/066* (2013.01); *H01M 8/0267* (2013.01); *H01M 8/0618* (2013.01); *H01M 8/0643* (2013.01); *Y02E 60/50* (2013.01)

(58) Field of Classification Search
CPC .. C01B 2203/066; C01B 3/065; H01M 8/065; H01M 8/0687; Y02E 60/50
See application file for complete search history.

(56) References Cited

U.S. PATENT DOCUMENTS

2005/0036941 A1*   2/2005   Bae .......................... B01J 7/02
                                                                  423/658.2
2013/0221123 A1    8/2013   Oshinowo et al.

FOREIGN PATENT DOCUMENTS

CN        1319849      6/2007
CN      100396596      6/2008
(Continued)

OTHER PUBLICATIONS

"Office Action of Japan Counterpart Application," issued on Jun. 21, 2016, p. 1-p. 3.

*Primary Examiner* — Patrick Ryan
*Assistant Examiner* — Ben Lewis
(74) *Attorney, Agent, or Firm* — Jianq Chyun IP Office

(57) ABSTRACT

A hydrogen generating device includes a first housing, a porous structure, a first flow-guiding structure and a heating unit. The first housing accommodates a solid reactant. The porous structure is disposed in the first housing. The first flow-guiding structure has first and second end portions opposite to each other. The first end portion is connected to the porous structure. The second end portion protrudes outside the first housing and is connected to the heating unit. A liquid reactant passing through the second end portion is gasified into a gaseous reactant through the heating unit. The gaseous reactant passing through the first end portion reaches to the porous structure and then is diffused from the porous structure into the first housing, so that the gaseous reactant and the solid reactant react and generate a hydrogen gas. A power generating equipment including the hydrogen generating device is also provided.

17 Claims, 3 Drawing Sheets

(56) References Cited

FOREIGN PATENT DOCUMENTS

| JP | S54-121292 | 9/1979 |
| JP | H08-209349 | 8/1996 |
| JP | 2007502248 | 2/2007 |

* cited by examiner

HYDROGEN GENERATING DEVICE AND POWER GENERATING EQUIPMENT

CROSS-REFERENCE TO RELATED APPLICATION

This application claims the priority benefit of China application serial no. 201410401922.3, filed on Aug. 15, 2014. The entirety of the above-mentioned patent application is hereby incorporated by reference herein and made a part of this specification.

BACKGROUND OF THE DISCLOSURE

1. Field of the Disclosure

The disclosure relates to a hydrogen generating device and a power generating equipment, and more particularly to a hydrogen generating device and a power generating equipment having a heating unit.

2. Description of Related Art

Fuel cell modules are power generating equipment in which chemical energy is used and directly transformed into electrical energy. Taking a proton exchanging membrane fuel cell as an example, the operating principle is that the hydrogen gas is subjected to an oxidation reaction at the anode catalyst layer, and hydrogen ions (H+) and electrons (e−) are generated, or methanol and water are subjected to an oxidation reaction at the anode catalyst layer, and hydrogen ions (H+), carbon dioxide ($CO_2$) and electrons (e−) are generated, the hydrogen ions may be transported to the cathode through the proton conducting membrane, while the electrons can be transported to the cathode after the electrons flowing through an external circuit are applied to a load to work. Here, reduction reaction between the oxygen supplied to the cathode and the hydrogen ions and the electrons occurs at a cathode catalyst layer, and thereby water is produced. The fuel hydrogen gas needed by the anode may be obtained by solid $NaBH_4$ generating hydrogen technology in which liquid water is added to solid $NaBH_4$ to perform a chemical reaction for generating a hydrogen gas.

In general, the solid $NaBH_4$ is placed in a reacting tank and the liquid water is guided into the reacting tank for reacting with the solid $NaBH_4$ to generate a hydrogen gas. However, a slurry-shaped mixture is easy to be formed after the liquid water and the solid $NaBH_4$ are mixed under the room temperature, it may cause the diffusion of the liquid water inferior, and the non-reacted solid $NaBH_4$ cannot be quickly contacted with the liquid water, resulting an incomplete reaction. Therefore, in order to enhance the reacting rate of the liquid water and the solid $NaBH_4$, a hydrophilic material is needed to be added into the reacting tank, or by way of channels design to guide more water flowing thereto, the water is guided into the reacting tank from a plurality of places, as such this way may increase the generating cost of the power generating equipment. In addition, the hydrophilic material may generally include ammonia, and the ammonia may cause the fuel cell stack rapidly failed, thus the filtering apparatus disposed between the fuel cell stack and the reacting tank has to effectively filter out the ammonia, and the load of filtering apparatus is increased. Moreover, since the diffusion of the liquid water is inferior and easy to cause some portion of the solid $NaBH_4$ unable to react with the liquid water, in order to solve this problem, an amount of liquid water that is much more than required amount for actual reaction has to be provided. However, the too much amount of liquid water may increase the possibility of leakage of the power generating equipment, and the liquid water which remains in the reacting tank may gradually react with the remained solid $NaBH_4$ and hydrogen gas may remain in the reacting tank, thus it may further affects the safety thereof. Furthermore, all of the hydrophilic material, guiding the water into the reacting tank from several places, and providing an amount of liquid water that is much more than a required amount for actual reaction may cause the whole structural volume and weight increased, the disposing space of the solid $NaBH_4$ is restricted, as such, the energy density of power generating equipment may be substantially decreased.

The Chinese Patent Reference CN100396596C discloses a hydrogen generating device which uses capillary materials for guiding the fluid onto the solid hydride. The Chinese Patent Reference CN1319849C discloses a power generating device, wherein the water steam generated by the water steam generating device is provided to the hydrogen generating device to react and generate the hydrogen gas, the water steam generating device uses porous structures such as cotton fibers or polymeric fibers as a barrier so as to prevent the liquid leakage, and the water steam may enter and exit the water steam generating device through the porous structures.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention was acknowledged by a person of ordinary skill in the art.

SUMMARY OF THE DISCLOSURE

The disclosure is directed to a hydrogen generating device having favorable hydrogen generating efficiency.

The disclosure is directed to a power generating equipment and its hydrogen generating device has favorable hydrogen generating efficiency.

Other objects and advantages of the disclosure can be further illustrated by the technical features broadly embodied and described as follows.

In order to obtain a part or all of the objects or other objects, an exemplary embodiment of the disclosure provides a hydrogen generating device including a first housing, a porous structure, a first flow-guiding structure and a heating unit. The first housing accommodates a solid reactant. The porous structure is disposed in the first housing. The first flow-guiding structure has a first end portion and a second end portion opposite to the first end portion, the first end portion is connected to the porous structure, and the second end portion protrudes outside the first housing. The heating unit is connected to the second end portion, a liquid reactant is adapted to be gasified to become a gaseous reactant through the heating unit, and the gaseous reactant passes through the first flow-guiding structure to reach to the porous structure and then diffused from the porous structure into the first housing, so that the gaseous reactant and the solid reactant react and generate a hydrogen gas.

In another exemplary embodiment of the disclosure, when the temperature of the porous structure is lower than a temperature value and the gaseous reactant reaches to the porous structure, the gaseous reactant is cooled and liquefied to become the liquid reactant and accommodated in the porous structure, when the temperature of the porous structure is higher than the temperature value, the liquid reactant accommodated in the porous structure is heated and gasified to become the gaseous reactant and then diffused from the porous structure into the first housing.

In an exemplary embodiment of the disclosure, the porous structure includes a top portion and a bottom portion, the top portion is located between the solid reactant and the bottom portion, the bottom portion is connected to the first end portion of the first flow-guiding structure, and the outer diameter of the top portion is larger than the outer diameter of the bottom portion.

In another exemplary embodiment of the disclosure, the outer diameter of the top portion is gradually decreased from the bottom portion toward the solid reactant.

In an exemplary embodiment of the disclosure, the power generating equipment further includes a heat conductive structure, wherein the heat conductive structure is connected to the porous structure and located in the first housing, the thermal energy generated by the reaction of the gaseous reactant and the solid reactant is absorbed by the heat conductive structure and conducted to the first flow-guiding structure, so that the liquid reactant located at the first flow-guiding structure is heated and gasified to become the gaseous reactant.

In an exemplary embodiment of the disclosure, the heat conductive structure is a pillar and surrounded by the solid reactant.

In an exemplary embodiment of the disclosure, the porous structure includes a powdered sintered material.

In an exemplary embodiment of the disclosure, the powdered sintered material is a metal powdered sintered material.

In order to achieve one or a portion of or all of the objects or other objects, one embodiment of the disclosure provides a power generating equipment including a hydrogen generating device and a fuel cell stack. The hydrogen generating device includes a first housing, a porous structure, a first flow-guiding structure and a heating unit. The first housing accommodates a solid reactant. The porous structure is disposed in the first housing. The first flow-guiding structure has a first end portion and a second end portion opposite to the first end portion, the first end portion is connected to the porous structure, and the second end portion protrudes outside the first housing. The heating unit is connected to the second end portion, a liquid reactant is adapted to be gasified to become a gaseous reactant through the heating unit, and the gaseous reactant passes through the first flow-guiding structure to reach to the porous structure and then diffused from the porous structure into the first housing, so that the gaseous reactant and the solid reactant react and generate a hydrogen gas. The fuel cell stack is connected to the hydrogen generating device, the hydrogen gas is adapted to be transported from the hydrogen generating device to the fuel cell stack and reacts at the fuel cell stack to generate an electrical energy.

In light of the above, the embodiment of the disclosure achieves at least one of the following advantages, in the embodiment of the disclosure, the heating unit is used for heating the liquid reactant so that the liquid reactant is gasified to become a gaseous reactant. Accordingly, the gaseous reactant may sufficiently react with the solid reactant for hydrogen generating reaction due to the superior diffusion, and the temperature of the gaseous reactant is higher than that of liquid reactant, thus the chemical reaction rate is increased. Therefore, adding hydrophilic material into the first housing is no longer necessary, and guiding the liquid reactant from several places into the first housing by multi-point water entering manner is also no longer necessary for increasing the reaction rate, and the manufacturing cost of the power generating equipment may be saved. In addition, since no need to add hydrophilic material into the first housing, the filtering unit disposed between the fuel cell stack and the first housing does not need to filter the ammonia included in the hydrophilic material, and the load of the filtering unit may be reduced.

Additionally, since the gaseous reactant with a superior diffusion is used for reacting with the solid reactant for hydrogen generating reaction, only an appropriate amount of the liquid reactant is required and gasified as mentioned above to become the gaseous reactant, then the gaseous reactant and the solid reactant may completely react for hydrogen generating reaction. As such, the power generating equipment may prevent causing liquid leakage due to storing too much liquid reactant, and may also prevent that the liquid reactant which remains in the first housing gradually reacts with the remained solid reactant and hydrogen gas remains in the first housing, so as to enhance the safety of the hydrogen generating device. Furthermore, since the hydrogen generating device of the disclosure does not require disposing any hydrophilic material and multi-point water entering design as mentioned above, and as above mentioned merely an appropriate amount of liquid reactant is required, the disposing space may be saved for disposing sufficient solid reactant, thus the energy density of the first housing is further improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
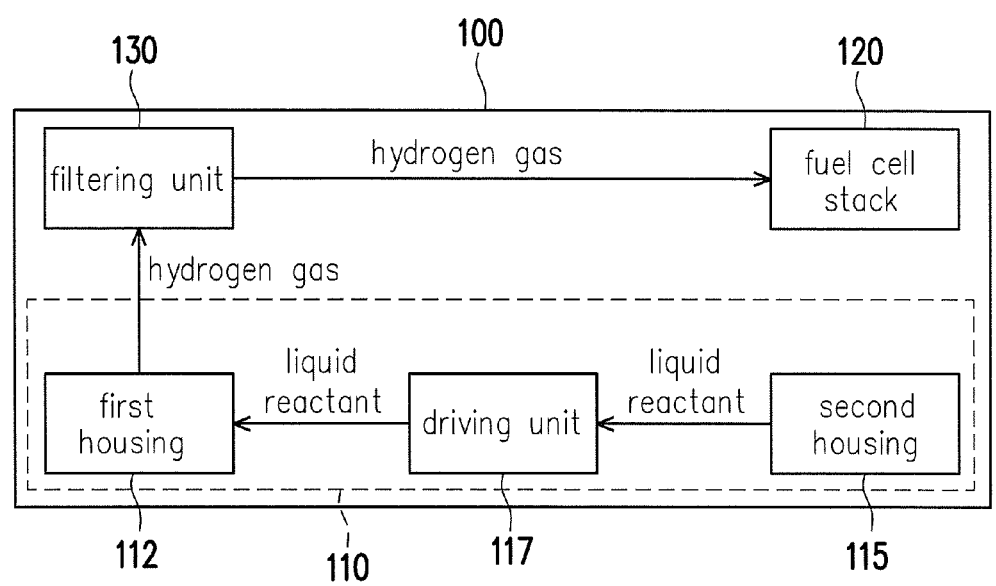
FIG. 1 is a block diagram of a power generating equipment according to an exemplary embodiment of the disclosure.

FIG. 1 is a block diagram of a power generating equipment according to an exemplary embodiment of the disclosure. Referring to FIG. 1, the power generating equipment 100 in the embodiment includes a hydrogen generating device 110 (the range enclosed by the dotted lines), a fuel cell stack 120 and a filtering unit 130. The filtering unit 130 is connected between the hydrogen generating device 110 and the fuel cell stack 120, the hydrogen gas generated by the hydrogen generating device 110 passes through the filtering unit 130 and is transported to the fuel cell stack 120, and reacts at the fuel cell stack 120 to generate an electrical energy.

In the embodiment, the fuel cell stack 120 is a single sided flat plate type cell stack, for example. In addition, the fuel cell stack 120 may also be proton exchange membrane fuel cell (PEMFC), alkaline fuel cell (AFC), phosphoric acid fuel cell (PAFC), molten carbonate fuel cell (MCFC), solid oxide fuel cell (SOFC), or other sorts of fuel cells which use hydrogen gas for generating electrical energy, and the disclosure is not limited thereto. In addition, in other embodiments, the hydrogen generating device may not be applied in power generating equipment but may alternatively be applied in other devices which use hydrogen gas as a fuel or reactant, and the disclosure is not limited thereto.

Figure 2:
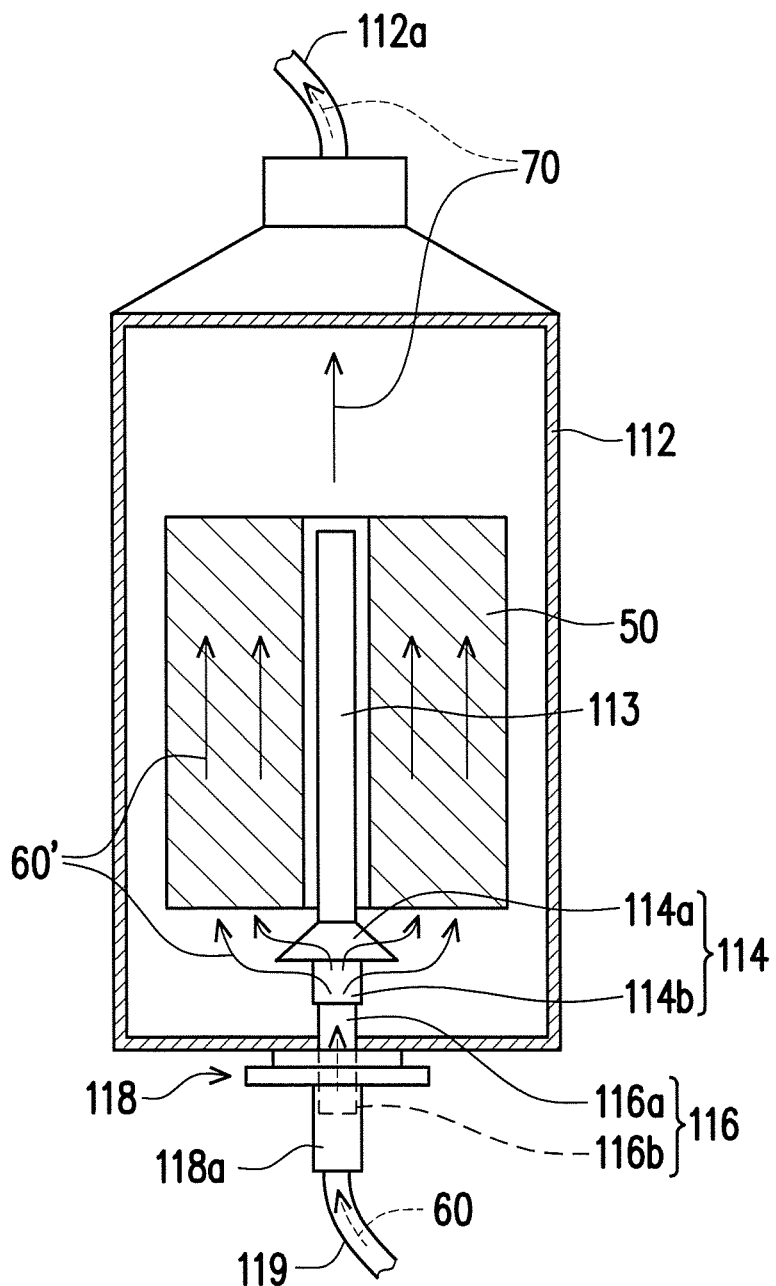
FIG. 2 is a schematic view of a portion of components of the hydrogen generating device in FIG. 1.
Figure 3:
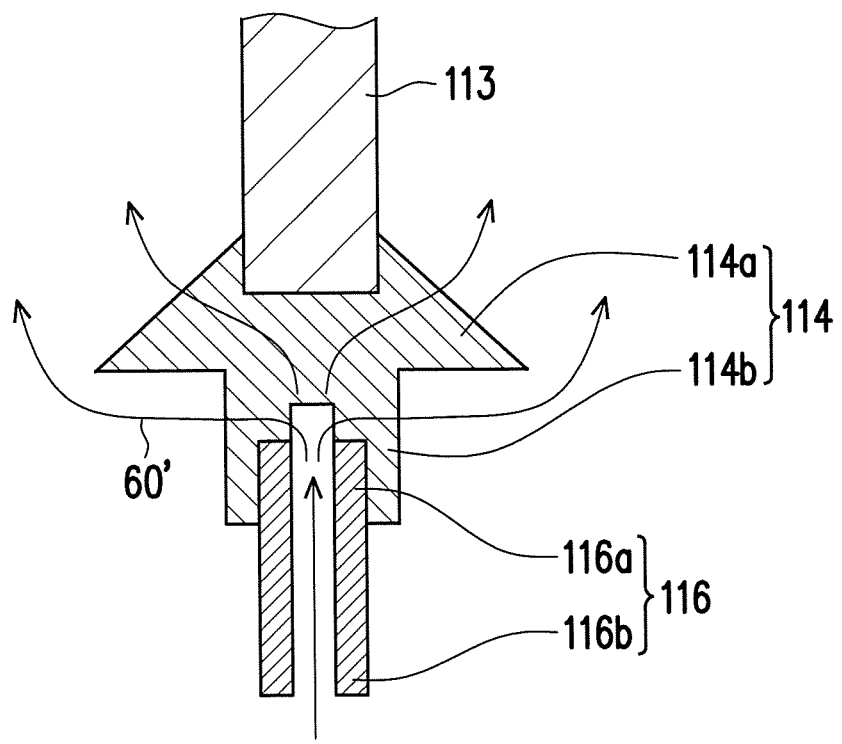
FIG. 3 is a schematic sectional view of the partially enlarged hydrogen generating device in FIG. 2.

FIG. 2 is a schematic view of a portion of components of the hydrogen generating device in FIG. 1. FIG. 3 is a schematic sectional view of the partially enlarged hydrogen generating device in FIG. 2. For the sake of clearance of the drawings, a portion of components in FIG. 2 is shown in a sectional view. Referring to FIG. 2 and FIG. 3, in detailed, the hydrogen generating device 110 includes a first housing 112, a porous structure 114, a first flow-guiding structure 116 and a heating unit 118. The first housing 112 accommodates a solid reactant 50, and the porous structure 114 is disposed in the first housing 112.

The porous structure 114 includes a powdered sintered material. For example, the porous structure 114 is manufactured by powder metallurgy processing method, wherein the processing method includes sintering process, one or more sorts of solid powder such as metal, oxide, nitride, or the like are required to be heated to reach a predetermined temperature, after that the powdered particles are bonded and shrunk, and a solid sintered structure with holes is further formed. In the embodiment, the porous structure 114 is a metal powdered sintered material, and has good heat conductivity since having a plurality of holes. The metal material may be copper, stainless steel, or any other suitable metal powdered particles, and the diameter of the powdered particle is in a range of about 10 μm to 100 μm. In another embodiment, the porous structure 114 may also be manufactured by sintering other materials, e.g., ceramic powder, which should not be construed as a limitation to the disclosure.

The first flow-guiding structure 116 is a pipe body, for example, and has a first end portion 116a and a second end portion 116b opposite to the first end portion 116a, the first end portion 116a of the first flow-guiding structure 116 is connected to the porous structure 114, the second end portion 116b protrudes outside the first housing 112, and a rubber ring or other suitable sealing element is used for sealing between the second end portion 116b of the first flow-guiding structure 116 and the first housing 112. The heating unit 118 is disposed outside of the first housing 112 and is connected to the second end portion 116b of the first flow-guiding structure 116. The liquid reactant 60 passes through the second end portion 116b of the first flow-guiding structure 116 and is heated and gasified to become a gaseous reactant 60' by the heating unit 118, and the gaseous reactant 60' reaches to the porous structure 114 through the first end portion 116a of the first flow-guiding structure 116 and then is diffused from the porous structure 114 into the first housing 112, so that the gaseous reactant 60' and the solid reactant 50 react and generate a hydrogen gas (indicated as 70 in FIG. 2) in the first housing 112 as shown in FIG. 1, and the hydrogen gas 70 is guided to the filtering unit 130 shown in FIG. 1 through the pipe 112a.

As the abovementioned hydrogen generating method, the gaseous reactant 60' may sufficiently react with the solid reactant 50 for hydrogen generating reaction due to its superior diffusion. Therefore, adding hydrophilic material into the first housing 112 is no longer necessary, and guiding the liquid reactant 60 from several places into the first housing 112 by multi-point water entering manner is also no longer necessary for increasing the reaction rate, and the manufacturing cost of the power generating equipment 100 may be saved. In addition, since no need to add hydrophilic material into the first housing 112, the filtering unit 130 disposed between the fuel cell stack 120 and the first housing 112 does not need to filter the ammonia included in the hydrophilic material, and then the load of the filtering unit 130 may be reduced.

Additionally, since the gaseous reactant 60' with a superior diffusion is used for reacting with the solid reactant 50 for performing hydrogen generating reaction, only an appropriate amount of the liquid reactant 60 is required and gasified as mentioned above to become the gaseous reactant 60', then the gaseous reactant 60' and the solid reactant 50 may completely react to generate hydrogen. As such, the power generating equipment 100 may prevent causing liquid leakage due to storing too much liquid reactant 60, and may also prevent that the liquid reactant 60 which remains in the first housing 112 gradually reacts with the remained solid reactant 50 and the generated hydrogen gas remains in the first housing 112, so as to enhance the safety of the hydrogen generating device 110. Furthermore, since the hydrogen generating device 110 of the embodiment does not require disposing any hydrophilic material and multi-point water entering design as mentioned above, and as above mentioned merely an appropriate amount of liquid reactant 60 is required, the disposing space may be saved for disposing sufficient solid reactant 50, thus the energy density of the first housing 112 is further improved, approximately 1000 Wh/L.

In the embodiment, for example, the liquid reactant is liquid water ($H_2O$), the gaseous reactant is water steam, the solid reactant may be solid hydride, e.g., the solid NaBH$_4$ adding with an appropriate amount of solid catalyst, through the reaction of solid NaBH$_4$ and water steam, the hydrogen gas is generated, and the reaction equation is $$NaBH_4 + 2H_2O \xrightarrow{catalyst} 4H_2 + NaBO_2.$$

In other embodiments, hydrogen gas may also be generated by reactions of other suitable solid reactants and gaseous reactants, and the disclosure is not limited thereto.

For example, the solid reactant may be other sorts of solid hydride, such as boron hydride, nitrogen hydride, carbon hydride, metal hydride, boron nitrogen hydride, boron carbon hydride, nitrogen carbon hydride, metal boron hydride, metal nitrogen hydride, metal carbon hydride, metal boron nitrogen hydride, metal boron carbon hydride, metal carbon nitrogen hydride, boron nitrogen carbon hydride, metal boron nitrogen carbon hydride, or the combination thereof, except the abovementioned boron hydride, may further include, but not limited thereto, NaH, LiBH$_4$, LiH, CaH$_2$, Ca(BH$_4$)$_2$, MgBH$_4$, KBH$_4$ and Al(BH$_3$)$_3$. In addition, the solid reactant may be various compounds having B$_x$N$_y$H$_z$ and include, but not limited thereto, H$_3$BNH$_3$, H$_2$B(NH$_3$)$_2$BH$_3$, NH$_2$BH$_2$, B$_3$N$_3$H$_6$, morpholineborane (C$_4$H$_{12}$BNO), (CH$_2$)$_4$O composite material, B$_2$H$_4$, or a combination thereof. The solid catalyst may be solid acid or salt including ruthenium (Ru), cobalt (Co), nickel (Ni), copper (Cu), iron (Fe) or solid catalyst manufactured by the ions thereof.

In the embodiment, the hydrogen generating device 110 as shown in FIG. 1 includes a second housing 115 and a driving unit 117, and the hydrogen generating device 110 as shown in FIG. 2 includes a second flow-guiding structure 119. The second housing 115 is used for accommodating the liquid reactant 60, and the second flow-guiding structure 119 may be a guiding pipe and connected between the second housing 115 and the first flow-guiding structure 116, for example. The liquid reactant 60 is driven by the driving unit 117, and from the second housing 115 passes through the second flow-guiding structure 119 and reaches to the first flow-guiding structure 116. The driving unit 117 is, for example, a pump or other suitable driving element, and the disclosure is not limited thereto.

In more detailed, the heating unit 118 of the embodiment as shown in FIG. 2 has a pipe portion 118a, and the second flow-guiding structure 119 is connected to the pipe portion 118a of the heating unit 118. The first housing 112 is, for example, a disposable tank body and may communicate with the second flow-guiding structure 119 via the first flow-guiding structure 116 fixed at the bottom thereof and the pipe portion 118a which is inserted into the heating unit 118.

Referring to FIG. 2 and FIG. 3, the porous structure 114 of the embodiment includes a top portion 114a and a bottom portion 114b, the top portion 114a of the porous structure 114 is located between the solid reactant 50 and the bottom portion 114b, the bottom portion 114b of the porous structure 114 is connected to the first end portion 116a of the first flow-guiding structure 116, the outer diameter of the top portion 114a in the vicinity of the bottom portion 114b is larger than the outer diameter of the bottom portion 114b, and the outer diameter of the top portion 114a is gradually decreased from the bottom portion 114b toward the solid reactant 50, so that the porous structure 114 is in a umbrella shape. By way of designing the top portion 114a of the porous structure 114 to have a larger outer diameter, the top portion 114a has a larger surface area, such that a portion of the gaseous reactant 60' may diffuse more evenly toward the solid reactant 50 through the surface of the top portion 114a of the porous structure 114. In addition, the gaseous reactant 60' which diffuses from the bottom portion 114b of the porous structure 114 toward the outside may radially diffuse in a direction along the outer diameter of the top portion 114a (radial direction) through the guiding of the top portion 114a which has a larger outer diameter, then flows upwardly along the top portion 114a and reaches to the solid reactant 50, so as to further enhance the diffusion of the gaseous reactant 60'. In the embodiment, the bottom portion 114b of the porous structure 114 is a hollow cylindrical body and the top portion 114a is a cone, in other embodiments, the bottom portion 114b and the top portion 114a may also be other pillar body or conical body, and the disclosure is not limited thereto.

Referring to FIG. 2, the hydrogen generating device 110 further includes a heat conductive structure 113, and the heat conductive structure 113 is a pillar and surrounded by the solid reactant 50. The heat conductive structure 113 is connected to the top portion 114a of the porous structure 114 and located in the first housing 112, the hydrogen generating reaction conducted by the gaseous reactant 60' and the solid reactant 50 is an exothermic reaction, and the thermal energy generated by the reaction is absorbed by the heat conductive structure 113 and conducted to the first flow-guiding structure 116 through the porous structure 114, so that the liquid reactant 60 located at the first flow-guiding structure 116 is heated and gasified to become the gaseous reactant 60'. The materials of the heat conductive structure 113 and the first flow-guiding structure 116 may be metal, for example, so that the thermal energy of the heat conductive structure 113 may be conducted rapidly to the first flow-guiding structure 116. In another embodiment, for example, the first flow-guiding structure 116 may be a copper pipe inserted in the heating unit 118, and the hydrogen generating device 110 may be preheated according to different environmental temperatures, so as to realize that the hydrogen generating device 110 may be smoothly activated under different environmental temperatures.

As described above, when the hydrogen generating device 110 is initially activated and before the heat conductive structure 113 absorbs the thermal energy generated by the hydrogen generating reaction, the liquid reactant 60 which flows through the first flow-guiding structure 116 is required to be heated by using the heating unit 118, so that the liquid reactant 60 is gasified to become the gaseous reactant 60'. Then, after the heat conductive structure 113 absorbs the thermal energy generated by the hydrogen generating reaction as abovementioned and the thermal energy is conducted to the first flow-guiding structure 116 through the porous structure 114, the liquid reactant 60 which flows through the first flow-guiding structure 116 may be heated by the thermal energy from the heat conductive structure 113, and the heating unit 118 is no longer needed for heating the liquid reactant 60. Accordingly, the operating time length of the heating unit 118 may be reduced, so as to save the power consumption of the heating unit 118.

In addition, under the condition that the hydrogen generating device 110 is initially activated and the porous structure 114 is in low temperature (namely, the temperature of the porous structure 114 is lower than a temperature value), when the gaseous reactant 60' reaches to the porous structure 114, the gaseous reactant 60' may be cooled and liquefied to become the liquid reactant 60, and the liquid reactant 60 which is liquefied at the porous structure 114 may be accommodated in the plurality of holes of the porous structure 114, so as to prevent the liquid reactant 60 from directly flowing to the solid reactant 50 and generating an uneven hydrogen generating reaction. Next, the temperature of the porous structure 114 may increase along with more high-temperature gaseous reactant 60' arrives and along with the hydrogen generating reaction thermal energy which is absorbed by the heat conductive structure 113 and conducted to the porous structure 114, till the porous structure 114 is transformed to be high temperature situation (namely the temperature of the porous structure 114 is higher than the temperature value), at this time the liquid reactant 60 accommodated in the holes of the porous structure 114 may be heated by the porous structure 114 which is in high temperature situation and gasified to become the gaseous reactant 60' and diffused from the porous structure 114 into the first housing 112, so as to evenly react with the solid reactant 50 for hydrogen generating reaction.

In the embodiment, for example, the liquid reactant 60 is heated by the heating unit 118 up to 150 degree Celsius and the liquid reactant 60 is gasified to become the gaseous reactant 60'. In the embodiment, the heating unit 118 may be disposed to heat the liquid reactant 60 up to other appropriate temperature, for example above 100 degree Celsius, and the liquid reactant 60 is gasified to become the gaseous reactant 60', however the disclosure is not limited thereto. In addition, having the aid of the thermal energy generated by the hydrogen generating reaction and the heat conductive structure 113 conducting the thermal energy, the temperature of the gaseous reactant 60' may be continuously increased during the operating process of the hydrogen generating device 110, so that the hydrogen generating reaction may be conducted under a higher temperature (e.g., 250 degree Celsius) and further have a high reaction rate. As such, the user may instantaneously control the flow rate of hydrogen gas provided to the fuel cell stack 120 by the aid of adjusting the flow rate of the liquid reactant 60, so as to enhance the convenience of the operation of the power generating equipment 100.

In light of the foregoing, the embodiment of the disclosure achieves at least one of the following advantages, in the embodiment of the disclosure, the heating unit is used for heating the liquid reactant so that the liquid reactant is gasified to become a gaseous reactant. Accordingly, the gaseous reactant may sufficiently react with the solid reactant for hydrogen generating reaction through its superior diffusion. Therefore, adding hydrophilic material into the first housing is no longer necessary, and guiding the liquid reactant from several places into the first housing by multi-point water entering manner is also no longer necessary for increasing the reaction rate, and the manufacturing cost of the power generating equipment may be saved. In addition, since no need to add hydrophilic material into the first housing, the filtering unit disposed between the fuel cell stack and the first housing does not need to filter the ammonia included in the hydrophilic material, and the load of the filtering unit is reduced.

Additionally, since the gaseous reactant with a superior diffusion is used for reacting with the solid reactant for hydrogen generating reaction, only an appropriate amount of the liquid reactant is required and gasified as mentioned above to become the gaseous reactant, then the gaseous reactant and the solid reactant may completely react to generate hydrogen. As such, the power generating equipment may prevent causing liquid leakage due to storing too much liquid reactant, and may also prevent that the liquid reactant which remains in the first housing gradually reacts with the remained solid reactant and hydrogen gas remains in the first housing, so as to enhance the safety of the hydrogen generating device. Furthermore, since the hydrogen generating device of the disclosure does not require disposing any hydrophilic material and multi-point water entering design as mentioned above, and as above mentioned merely an appropriate amount of liquid reactant is required, the disposing space may be saved for disposing sufficient solid reactant, thus the energy density of the power generating equipment, such as the energy density per unit weight of the hydrogen generating device, and the energy density per unit volume of the first housing is further enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A hydrogen generating device, comprising:
   a first housing accommodating a solid reactant;
   a porous structure disposed in the first housing;
   a first flow-guiding structure having a first end portion and a second end portion opposite to the first end portion, wherein the first end portion is connected to the porous structure, and the second end portion protrudes outside the first housing; and
   a heating unit connected to the second end portion, wherein a liquid reactant is adapted to be gasified to become a gaseous reactant through the heating unit, and the gaseous reactant passes through the first flow-guiding structure to reach to the porous structure and then is diffused from the porous structure into the first housing, so that the gaseous reactant and the solid reactant react and generate a hydrogen gas.

2. The hydrogen generating device as claimed in claim 1, wherein when a temperature of the porous structure is lower than a temperature value and the gaseous reactant reaches to the porous structure, the gaseous reactant is cooled and liquefied to become the liquid reactant and accommodated in the porous structure, when the temperature of the porous structure is higher than the temperature value, the liquid reactant accommodated in the porous structure is heated and gasified to become the gaseous reactant and then diffused from the porous structure into the first housing.

3. The hydrogen generating device as claimed in claim 1, wherein the porous structure comprises a top portion and a bottom portion, the top portion is located between the solid reactant and the bottom portion, the bottom portion is connected to the first end portion of the first flow-guiding structure, and an outer diameter of the top portion is larger than an outer diameter of the bottom portion.

4. The hydrogen generating device as claimed in claim 3, wherein the outer diameter of the top portion is gradually decreased from the bottom portion toward the solid reactant.

5. The hydrogen generating device as claimed in claim 1, further comprising a heat conductive structure, wherein the heat conductive structure is connected to the porous structure and located in the first housing, a thermal energy generated by the reaction of the gaseous reactant and the solid reactant is absorbed by the heat conductive structure and conducted to the first flow-guiding structure, so that the liquid reactant located at the first flow-guiding structure is heated and gasified to become the gaseous reactant.

6. The hydrogen generating device as claimed in claim 5, wherein the heat conductive structure is a pillar and surrounded by the solid reactant.

7. The hydrogen generating device as claimed in claim 1, wherein the porous structure comprises a powdered sintered material.

8. The hydrogen generating device as claimed in claim 7, wherein the powdered sintered material is a metal powdered sintered material.

9. A power generating equipment, comprising:
   a hydrogen generating device comprising:
      a first housing accommodating a solid reactant;
      a porous structure disposed in the first housing;
      a first flow-guiding structure having a first end portion and a second end portion opposite to the first end portion, wherein the first end portion is connected to the porous structure, and the second end portion protrudes outside the first housing; and
      a heating unit connected to the second end portion, wherein a liquid reactant is adapted to be gasified to become a gaseous reactant through the heating unit, and the gaseous reactant passes through the first flow-guiding structure to reach to the porous structure and then is diffused from the porous structure into the first housing, so that the gaseous reactant and the solid reactant react and generate a hydrogen gas; and
   a fuel cell stack connected to the hydrogen generating device, wherein the hydrogen gas is transported from the hydrogen generating device to the fuel cell stack and reacts at the fuel cell stack to generate an electrical energy.

10. The power generating equipment as claimed in claim 9, wherein when a temperature of the porous structure is lower than a temperature value and the gaseous reactant reaches to the porous structure, the gaseous reactant is cooled and liquefied to become the liquid reactant and accommodated in the porous structure, when the temperature of the porous structure is higher than the temperature value, the liquid reactant accommodated in the porous structure is heated and gasified to become the gaseous reactant and then diffused from the porous structure into the first housing.

11. The power generating equipment as claimed in claim 9, wherein the porous structure comprises a top portion and a bottom portion, the top portion is located between the solid reactant and the bottom portion, the bottom portion is connected to the first end portion of the first flow-guiding structure, and an outer diameter of the top portion is larger than an outer diameter of the bottom portion.

12. The power generating equipment as claimed in claim 11, wherein the outer diameter of the top portion is gradually decreased from the bottom portion toward the solid reactant.

13. The power generating equipment as claimed in claim 9, further comprising a heat conductive structure, wherein the heat conductive structure is connected to the porous structure and located in the first housing, a thermal energy generated by the reaction of the gaseous reactant and the solid reactant is absorbed by the heat conductive structure and conducted to the first flow-guiding structure, so that the liquid reactant located at the first flow-guiding structure is heated and gasified to become the gaseous reactant.

14. The power generating equipment as claimed in claim 13, wherein the heat conductive structure is a pillar and surrounded by the solid reactant.

15. The power generating equipment as claimed in claim 9, wherein the porous structure comprises a powdered sintered material.

16. The power generating equipment as claimed in claim 15, wherein the powdered sintered material is a metal powdered sintered material.

17. The power generating equipment as claimed in claim 9, comprising a filtering unit, wherein the filtering unit is connected between the hydrogen generating device and the fuel cell stack, and the hydrogen gas is transported from the hydrogen generating device to the fuel cell stack through the filtering unit.

* * * * *